(12) United States Patent
Royak et al.

(10) Patent No.: US 8,115,437 B2
(45) Date of Patent: Feb. 14, 2012

(54) TORQUE LIMIT OF PM MOTORS FOR FIELD-WEAKENING REGION OPERATION

(75) Inventors: Semyon Royak, Beachwood, OH (US); Mark M. Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 852 days.

(21) Appl. No.: 12/036,099

(22) Filed: Feb. 22, 2008

(65) Prior Publication Data

US 2009/0212734 A1 Aug. 27, 2009

(51) Int. Cl.
*H02P 7/00* (2006.01)

(52) U.S. Cl. .............. 318/434; 318/400.02; 318/400.15; 318/432

(58) Field of Classification Search ............. 318/400.02, 318/400.07, 400.15, 432, 434, 400.01
See application file for complete search history.

(56) References Cited

U.S. PATENT DOCUMENTS

| | | | | |
|---|---|---|---|---|
| 4,649,331 A * | 3/1987 | Jahns | ............ | 318/798 |
| 5,796,236 A | 8/1998 | Royak | | |
| 6,075,332 A * | 6/2000 | McCann | ............ | 318/432 |
| 6,504,329 B2 * | 1/2003 | Stancu et al. | ............ | 318/400.23 |
| 6,636,012 B2 * | 10/2003 | Royak et al. | ............ | 318/727 |
| 6,703,809 B2 | 3/2004 | Royak et al. | | |
| 6,831,440 B1 | 12/2004 | Royak et al. | | |
| 6,982,533 B2 * | 1/2006 | Seibel et al. | ............ | 318/432 |
| 7,106,024 B2 | 9/2006 | Harbaugh et al. | | |
| 7,573,227 B2 * | 8/2009 | Kasaoka et al. | ............ | 318/807 |
| 7,595,600 B2 * | 9/2009 | Patel et al. | ............ | 318/432 |
| 7,667,426 B2 * | 2/2010 | Jeong et al. | ............ | 318/700 |
| 7,696,709 B2 * | 4/2010 | Endo et al. | ............ | 318/432 |
| 7,772,790 B2 * | 8/2010 | Nashiki | ............ | 318/400.02 |
| 2003/0169015 A1 * | 9/2003 | Royak et al. | ............ | 318/727 |
| 2005/0057212 A1 | 3/2005 | Harbaugh et al. | | |
| 2006/0034104 A1 | 2/2006 | Royak et al. | | |
| 2007/0291426 A1 | 12/2007 | Kasunich et al. | | |

* cited by examiner

*Primary Examiner* — Walter Benson
*Assistant Examiner* — Thai Dinh
(74) *Attorney, Agent, or Firm* — Fletcher Yoder, P.C.; Alexander R. Kuszewski; John M. Miller

(57) ABSTRACT

The invention includes a motor controller and technique for controlling a permanent magnet motor. In accordance with one aspect of the present technique, a permanent magnet motor is controlled by receiving a torque command, determining a physical torque limit based on a stator frequency, determining a theoretical torque limit based on a maximum available voltage and motor inductance ratio, and limiting the torque command to the smaller of the physical torque limit and the theoretical torque limit. Receiving the torque command may include normalizing the torque command to obtain a normalized torque command, determining the physical torque limit may include determining a normalized physical torque limit, determining a theoretical torque limit may include determining a normalized theoretical torque limit, and limiting the torque command may include limiting the normalized torque command to the smaller of the normalized physical torque limit and the normalized theoretical torque limit.

21 Claims, 7 Drawing Sheets

FIG. 6

| TABLE 1.2 | $D = V_{rtd}/(2*PI*F*FLUX)$ | | | | | $322 \longrightarrow D = 1.2$ | | | | $K = (L_q/L_d - 1) \longrightarrow 326$ | | | | | | | | FLUX CURRENT $I_d \longrightarrow 320$ |
|---|---|---|---|---|---|---|---|---|---|---|---|---|---|---|---|---|---|---|
| | 0.00 | 0.25 | 0.50 | 0.75 | 1.00 | ... | ... | ... | ... | ... | ... | ... | 4.00 | 4.25 | 4.50 | 4.75 | 5.00 |
| 0.00 | | | | | | | | | | | | | | | | | |
| 0.05 | | | | | | | | | | | | | | | | | |
| 0.10 | | | | | | | | | | | | | | | | | |
| 0.15 | | | | | | | | | | | | | | | | | |
| 0.20 | | | | | | | | | | | | | | | | | |
| ... | | | | | | | | | | | | | | | | | |
| ... | | | | | | | | | | | | | | | | | |
| ... | | | | | | | | | | | | | | | | | |
| ... | | | | | | | | | | | | | | | | | |
| ... | | | | | | | | | | | | | | | | | |
| 0.60 | | | | | | | | | | | | | | | | | |
| 1.65 | | | | | | | | | | | | | | | | | |
| 1.70 | | | | | | | | | | | | | | | | | |
| 1.75 | | | | | | | | | | | | | | | | | |
| 1.80 | | | | | | | | | | | | | | | | | |

324 — TORQUE_PER_UNIT

318

US 8,115,437 B2

TORQUE LIMIT OF PM MOTORS FOR FIELD-WEAKENING REGION OPERATION

STATEMENT REGARDING FEDERALLY SPONSORED RESEARCH & DEVELOPMENT

This invention was made with Government support under contract number NREL-ZCL-3-32060-03; W(A)-03-011, CH-1137 awarded by Department of Energy. The Government has certain rights in the invention.

BACKGROUND

The invention relates generally to torque control of a permanent magnet motor. More particularly, the invention relates to a technique for torque control of a permanent magnet motor operating above base speed.

Three phase interior permanent magnet synchronous motors (IPMSM) receive three phases of electrical voltage, which enter three stator windings of the motor to produce a rotating magnetic stator field. The rotating magnetic stator field interacts with a magnetic field associated with the permanent magnets of the motor. The rotor rotates based on interactions between the magnetic stator field and the permanent magnetic field of the rotor.

To more precisely control the output torque and speed of the motor, a synchronous reference frame may be employed, which is represented by a quadrature axis (q) and a direct axis (d) defined by the relative location of the rotor to the stator windings. In the synchronous reference frame, voltages for obtaining a particular torque and speed may be more easily determined. Once direct-axis and quadrature-axis voltages are obtained for the motor in the synchronous reference frame, a mathematical transformation may be used to produce the equivalent three-phase voltage in a stationary reference frame, in which (a), (b), and (c) axes are defined by the location of the stator windings of the motor. The three-phase voltage in the stationary reference frame may subsequently be used to drive the motor.

When operating below base speed (generally considered to be a speed at which a voltage limit has been reached and additional speed may be achieved primarily by weakening the magnetic fields of permanent magnets in the rotor), the amount of torque output by the motor may generally be adjusted by changing the magnitude and frequency of the driving voltages in a relatively straightforward manner. To operate above base speed, the stator current in the direct axis of the permanent magnet motor operates to weaken the magnetic field of the permanent magnets, and thus a motor operating above base speed may be referred to be operating in a field-weakening region. However, as the magnetic field of the permanent magnets is reduced, control becomes much more complex. Though techniques for generating a maximum torque per amperes with a permanent magnet motor have been developed, the techniques remain limited to very specific applications and may vary considerably from one motor to another.

BRIEF DESCRIPTION

The invention includes a motor controller and technique for controlling a permanent magnet motor. In accordance with one aspect of the present technique, a permanent magnet motor is controlled by receiving a torque command, determining a physical torque limit based on a stator frequency, determining a theoretical torque limit based on a maximum available voltage and motor saliency, and limiting the torque command to the smaller of the physical torque limit and the theoretical torque limit. The physical torque limit may be determined by multiplying a ratio of a rated stator frequency to the stator frequency with a rated torque and an overload torque ratio. For universality, receiving the torque command may include normalizing the torque command to obtain a normalized torque command, determining the physical torque limit may include determining a normalized physical torque limit, determining a theoretical torque limit may include determining a normalized theoretical torque limit, and limiting the torque command may include limiting the normalized torque command to the smaller of the normalized physical torque limit and the normalized theoretical torque limit. In each case, the normalized torque command, the normalized physical torque limit, and the normalized theoretical torque limit may be normalized to a characteristic current of the motor. Determining the theoretical torque limit may include determining the maximum available voltage based on the stator frequency, magnetic flux of permanent magnets in the motor, and a rated voltage of the motor, and determining the maximum available voltage may include determining a ratio of the rated voltage to a multiplication of the stator frequency and magnetic flux of the permanent magnets in the motor.

In accordance with another aspect of the present invention, a motor controller is provided that may include an inverter configured to supply a three-phase voltage to a permanent magnet motor, driver circuitry configured to cause the inverter to supply the three-phase voltage to the permanent magnet motor based on a voltage command, and control circuitry configured to receive a torque command and generate the voltage command based on the torque command. The control circuitry may be configured to limit the torque command to a theoretical torque limit based at least in part on a saliency of the permanent magnet motor. Additionally, the control circuitry may be configured to limit the torque command to the theoretical torque limit based at least in part on the saliency of the permanent magnet motor, a maximum available voltage, and a maximum available flux-producing current, and the control circuitry may be configured to limit the torque command to a lesser of the theoretical torque limit or a physical torque limit based on a stator frequency.

DRAWINGS

These and other features, aspects, and advantages of the present invention will become better understood when the following detailed description is read with reference to the accompanying drawings in which like characters represent like parts throughout the drawings, wherein:

FIG. 6 represents an exemplary two-dimensional component of a three-dimensional table for application in the optimum torque control block diagram depicted in FIG. 5.

DETAILED DESCRIPTION

Figure 1:
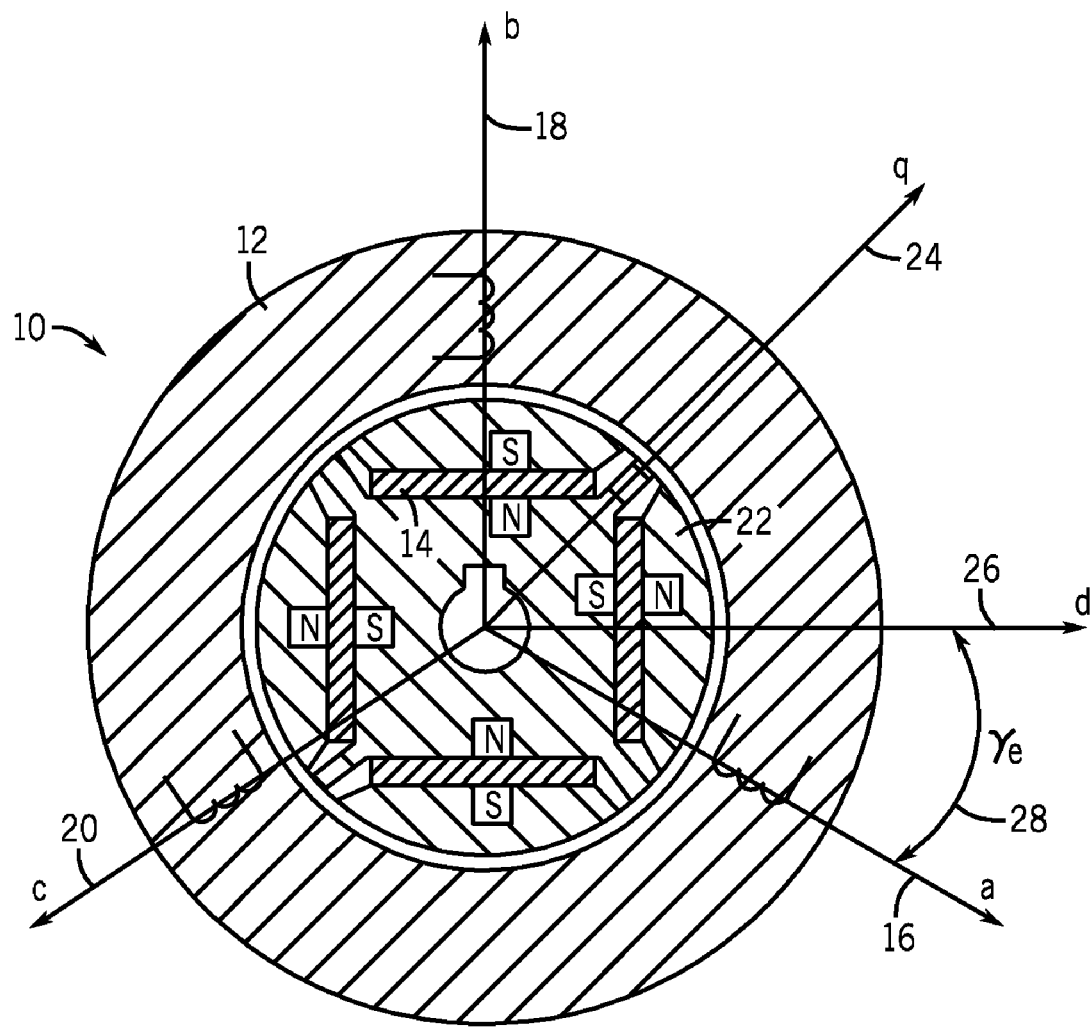
FIG. 1 is a simplified diagram of an interior permanent magnet synchronous motor.

FIG. 1 is a simplified diagram of an interior permanent magnet synchronous motor 10. The motor 10 includes conductive material 12 (typically ferromagnetic) and permanent magnets 14. Three stator windings 16, 18, and 20 receive a three-phase current to produce a stator magnetic field. The stator magnetic field interacts with a magnetic field caused by permanent magnets 14 within a rotor 22, causing the rotor 22 to rotate accordingly.

Three-phase voltage may generally be supplied to the stator windings 16, 18, and 20 by way of an inverter module (not shown), which may receive power from a DC voltage supply. Driver circuitry may direct the inverter module to output the three-phase power at a desired frequency, based upon control signals received by the driver circuitry from control circuitry. The control circuitry may generally determine the appropriate control signals to send to the driver circuitry based upon a torque signal received from an operator or remote controller, as well as feedback from the motor 10, the inverter module, the driver circuitry, and from calculations carried out within the control circuitry. To perform motor control operations, the control circuitry may include an appropriate processor, such as a microprocessor or field programmable gate array, and may perform a variety of motor control calculations, including those techniques described herein. The control circuitry may include a memory device or a machine-readable medium such as Flash memory, EEPROM, ROM, CD-ROM or other optical data storage media, or any other appropriate storage medium which may store data or instructions for carrying out the foregoing techniques.

To simplify the analysis of the motor 10, it may be assumed that material 12 has a permeability equal to infinity (i.e., there is no saturation), that the stator windings are assumed to be sinusoidal distributed (i.e., magneto motive force (mmf) space harmonics and slot harmonics may be neglected), and that the stator winding fields are assumed to be sinusoidally distributed, (i.e., only the first harmonic is shown). Additionally, the stator windings may be assumed to be symmetric, and thus winding turns, resistance, and inductances may be assumed to be equal. Further, a lumped-parameter circuit model may also be assumed.

In a stationary reference frame, the voltage and torque associated with stator windings 16, 18, and 20 of motor 10 may be represented by the following equations, where x represents the phases a, b, or c of motor 10:

$$V_x = R \cdot i_x + \frac{d\psi_x}{dt}; \tag{1}$$

$$\Sigma T = J \cdot \frac{d\omega}{dt}. \tag{2}$$

In equation (1), $V_x$ represents the instantaneous phase voltage [V], R represents the stator phase resistance [Ω], $i_x$ represents the instantaneous stator phase current [A], and $\Psi_x$ represents the instantaneous stator flux linkage [Wb]. In equation (2), $\Sigma T$ represents a sum of all torque [Nm], including load torque, of the motor 10, J represents the moment of inertia [kg m²], and ω represents rotor speed [rad/sec].

Flux linkage $\psi_a$, $\psi_b$, and $\psi_c$ for stator windings 16, 18, and 20 of motor 10 may be described according to the following equations:

$$\left.\begin{array}{l}\psi_a = L_a \cdot i_a + L_{ab} \cdot i_b + L_{ac} \cdot i_c + \psi_{am}\\ \psi_b = L_{ba} \cdot i_a + L_b \cdot i_b + L_{bc} \cdot i_c + \psi_{bm}\\ \psi_c = L_{ca} \cdot i_a + L_{cb} \cdot i_b + L_c \cdot i_c + \psi_{cm}\end{array}\right\}. \tag{3}$$

In equation (3) above, $L_a$, $L_b$, and $L_c$ represent self-inductance [H], $L_{ab}$, $L_{ba}$, $L_{ac}$, $L_{ca}$, $L_{bc}$, and $L_{cb}$ represent mutual inductances [H], and $\psi_{am}$, $\psi_{bm}$, and $\psi_{cm}$ represent flux linkage [Wb] from the permanent magnets 14. The values of self inductance and mutual inductance are a function of the rotor 22 position, which vary as the rotor 22 rotates relative to the stator windings a 16, b 18, and c 20. Mutual-inductances $L_{ab}$, $L_{ba}$, $L_{ac}$, $L_{ca}$, $L_{bc}$, and $L_{cb}$ also conform to the following equations:

$$\left.\begin{array}{l}L_{ab} = L_{ba}\\ L_{ac} = L_{ca}\\ L_{bc} = L_{cb}\end{array}\right\}. \tag{4}$$

Continuing to view FIG. 1, motor 10 may be understood to operate in a synchronous reference frame as well as a stationary frame. The synchronous reference frame includes a quadrature axis (q) 24 and a direct axis (d) 26. The quadrature axis (q) 24 is defined by the relative location of the permanent magnets of the rotor 22, and direct axis (d) 26 is defined relative to an angular position $\gamma_e$ 28 from stator windings a 16, b 18, and c 20. The equations for the motor 10 in the synchronous reference frame may be written in the following form:

$$V_d = R \cdot I_d + L_d \cdot \frac{dI_d}{dt} - L_q \cdot I_q \cdot \frac{d\gamma_e}{dt}; \tag{5}$$

$$V_q = R \cdot I_q + L_q \cdot \frac{dI_q}{dt} + (L_d \cdot I_d + \psi_{m0}) \cdot \frac{d\gamma_e}{dt}; \tag{6}$$

$$J \cdot \frac{d^2\gamma_e}{dt^2} = \frac{3}{2} \cdot p_n \cdot [\Psi_{m0} \cdot I_q + (L_d - L_q) \cdot I_d \cdot I_q] - T_{load}. \tag{7}$$

The equations above describe motor 10 in the synchronous reference frame (d, q). As such, $V_d$ represents a direct-axis voltage [V] and $V_q$ represents a quadrature-axis voltage [V] applied to the motor 10, R represents the stator resistance [Ω], $I_d$ represents a flux-producing current [A] and $I_q$ represents a torque-producing current [A], $L_d$ and $L_q$ represent direct-axis and quadrature-axis inductances [H], respectively, $\gamma_e$ represents angular distance $\gamma_e$ 28 [rad/sec], $\Psi_{m0}$ represents the magnetic flux [Wb] of the pole pairs of the rotor 22, $p_n$ represents the number of permanent magnets of the rotor 22, and $T_{load}$ represents the torque [Nm] exerted against motor 10 by the load. Self inductance $L_d$ and $L_q$ may be further represented according to equations (8) and (9) below. It should be noted that usually for a surface permanent magnet synchronous motor, $L_d$ is equal to $L_q$.

$$L_d = \frac{3}{2} \cdot (L_0 + L_m) = \frac{3}{2} \cdot L_{d.ph}; \tag{8}$$

$$L_q = \frac{3}{2} \cdot (L_0 - L_m) = \frac{3}{2} \cdot L_{q.ph}. \tag{9}$$

Figure 2:
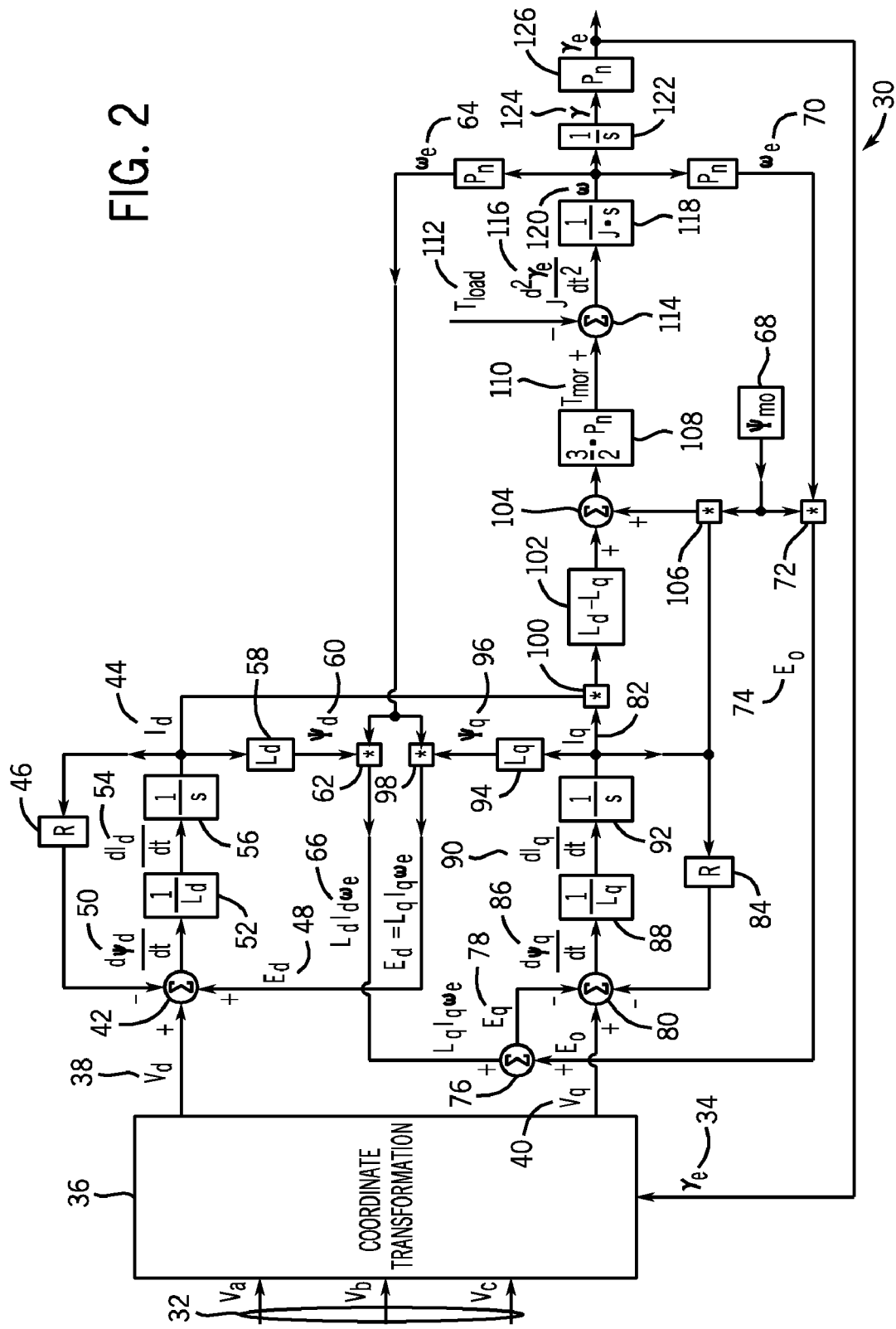
FIG. 2 is a dynamic block diagram of the interior permanent magnet synchronous motor of FIG. 1 in a synchronous reference frame.

Turning to FIG. 2, a dynamic block diagram 30 represents the interior permanent magnet synchronous motor 10 in a synchronous reference frame (d, q). With known values of the three-phase voltage waveforms 32 and the relative angular position $\gamma_e$ 34, a coordinate transformation 36 may be performed, producing direct-axis voltage $V_d$ 38, and quadrature-axis voltage $V_q$ 40. In accordance with equation (5) above, a summer 42 adds direct-axis voltage $V_d$ 38, subtracts direct-axis current $I_d$ 44 multiplied by stator resistance R 46, and adds voltage $E_d$ 48, outputting direct-axis change in flux $$\frac{d\Psi_d}{dt}$$

50, which is equal to $$L_d \cdot \frac{dI_d}{dt}.$$

The origin of voltage $E_d$ 48 will be discussed further below.

Because direct-axis change in flux $$\frac{d\Psi_d}{dt}$$

50 is equal to $$L_d \cdot \frac{dI_d}{dt},$$

multiplying the inverse of direct-axis inductance $$\frac{1}{L_d}$$

52 by direct-axis change in flux $$\frac{d\Psi_d}{dt} \ 50$$

produces direct-axis change in current $$\frac{dI_d}{dt} \ 54.$$

When direct-axis change in current $$\frac{dI_d}{dt} \ 54$$

is integrated by the Laplace operator $$\frac{1}{s} \ 56,$$

direct-axis current $I_d$ 44 results.

By multiplying direct-axis current $I_d$ 44 with direct-axis inductance $L_d$ 58, direct-axis flux $\psi_d$ 60 is produced. Direct-axis flux $\psi_d$ 60 may subsequently enter multiplier 62 with stator frequency $\omega_e$ 64, producing voltage $L_d I_d \omega_e$ 66. Permanent magnet flux $\Psi_{m0}$ 68 and stator frequency $\omega_e$ 70 multiplied in multiplier 72 produce voltage $E_0$ 74. When voltage $L_d I_d \omega_e$ 66 is added to voltage $E_0$ 74 in summer 76, voltage $E_q$ 78 results.

As apparent from equation (6), when summer 80 subtracts voltage $E_q$ 78 from quadrature-axis voltage $V_q$ 40 and quadrature-axis current $I_q$ 82 multiplied by stator resistance R 84, the result is quadrature-axis change in flux $$\frac{d\Psi_q}{dt} \ 86,$$

which is equal to $$L_q \cdot \frac{dI_q}{dt}.$$

Multiplying by the inverse of quadrature-axis inductance $$\frac{1}{L_q} \ 88$$

thus produces quadrature-axis change in current $$\frac{dI_q}{dt} \ 90,$$

which may be integrated via the Laplace operator $$\frac{1}{s} \ 92$$

to produce the quadrature-axis current $I_q$ 82.

When quadrature-axis current $I_q$ 82 is multiplied by quadrature-axis inductance $L_q$ 94, the result is quadrature-axis flux $\psi_q$ 96. Multiplying quadrature-axis flux $\psi_q$ 96 and stator frequency $\omega_e$ 64 in multiplier 98 produces voltage $E_d$ 48, which enters summer 42, as discussed above.

Quadrature-axis current $I_q$ 82 enters multiplier 100 where it is multiplied by direct-axis current $I_d$ 44. The result is multiplied by block 102, which represents a value of the direct-axis inductance $L_d$ less the quadrature-axis inductance $L_q$, and subsequently enters summer 104. Meanwhile, permanent magnet flux $\Psi_{m0}$ 68 is multiplied by quadrature-axis current $I_q$ 82 in multiplier 106 which enters summer 104. The output of summer 104 is subsequently multiplied by block 108, which represents the value $$\frac{3}{2} \cdot p_n,$$

to produce a motor torque $T_{mot}$ 110 representing the torque output by motor 10.

The load torque $T_{load}$ 112 may be subtracted from motor torque $T_{mot}$ 110 in summer 114, producing an excess torque $$J\frac{d^2\gamma_e}{dt^2}\ \mathbf{116}.$$

In block 118, $$\frac{1}{J \cdot s},$$

the moment of inertia J is divided from excess torque $$J\frac{d^2\gamma_e}{dt^2}\ \mathbf{116}$$

and excess torque $$J\frac{d^2\gamma_e}{dt^2}\ \mathbf{116}$$

is integrated, resulting in motor frequency ω 120 of motor 10.

By multiplying motor frequency ω 120 by permanent magnet pole pairs $p_n$, stator frequency $\omega_e$ 64 and 70 may be obtained. Motor frequency ω 120 may also be integrated in Laplace integral $$\frac{1}{s}\ \mathbf{122}$$

to produce a motor angular position γ 124. The motor angular position γ 124 may be subsequently multiplied by permanent magnet pole pairs $p_n$ 126 to obtain angular position $\gamma_e$ 34.

As illustrated by dynamic block diagram 30, equations (5) and (6) may be rewritten for a steady state condition, according to the following equations:

$$V_d = R \cdot I_d - L_q \cdot I_q \cdot \omega_e \tag{10};$$

$$V_q = R \cdot I_q + \omega_e \cdot L_d \cdot I_d + \omega_e \cdot \psi_{m0} \tag{11}.$$

Equations (10) and (11) may alternatively be expressed in the following form:

$$V_d = R \cdot I_d - E_d \tag{12};$$

$$V_q = R \cdot I_q + E_q \tag{13}.$$

In equations (12) and (13), $E_d$ and $E_q$ may be defined according to the following equations:

$$E_d = L_q \cdot I_q \cdot \omega_e \tag{14};$$

$$E_q = L_d \cdot I_d \cdot \omega_e + \psi_{m0} \cdot \omega_e = L_d \cdot I_d \cdot \omega_e + E_0 \tag{15};$$

$$E_\Sigma = \sqrt{E_d^2 + E_q^2} = \omega_e \sqrt{(L_q \cdot I_q)^2 + (L_d \cdot I_d + \psi_{m0})^2} \tag{16}.$$

Figure 3:
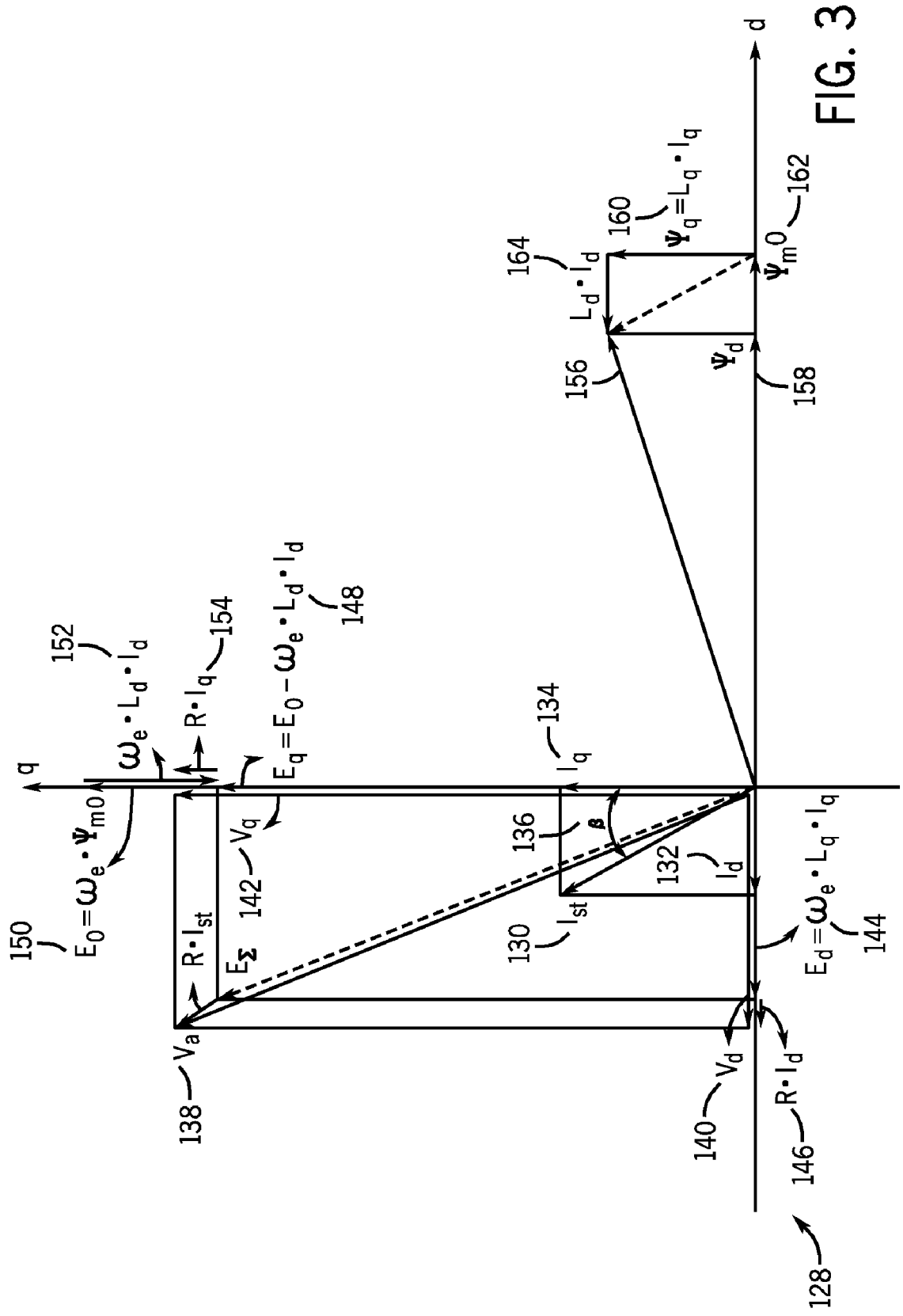
FIG. 3 is a vector diagram representing the phasors of operating parameters of the interior permanent magnet synchronous motor of FIG. 1.

FIG. 3 represents a basic vector diagram 128 of the motor 10, based upon equations (10)-(16) above. A stator current $I_{st}$ 130 may be broken into direct-axis and quadrature-axis components, direct-axis current $I_d$ 132 and quadrature-axis current $I_q$ 134, based upon on the magnitude of stator current $I_{st}$ 130 and an angle β 136. A stator voltage $V_a$ 138 may be broken into direct-axis and quadrature-axis components direct-axis voltage $V_d$ 140 and quadrature-axis voltage $V_q$ 142.

Direct-axis voltage $V_d$ 140 may be further broken into a voltage $E_d$ 144 component less a voltage drop $I_d \cdot R$ 146, representing the voltage drop across stator resistance R caused by direct-axis current $I_d$.

Quadrature-axis voltage $V_q$ 142 may also be broken into additional components. Voltage $E_q$ 148 is equal to voltage $E_0$ 150, which represents a value of stator frequency $\omega_e$ multiplied by permanent magnet flux $\psi_{m0}$, less a voltage $\omega_e \cdot L_d \cdot I_d$ 152. Quadrature-axis voltage $V_q$ 142 may be obtained by adding voltage drop $I_q \cdot R$ 154, representing a voltage drop across stator resistance R caused by quadrature-axis current $I_q$, to voltage $E_q$ 148.

Flux 156 may be broken into direct-axis and quadrature-axis components, direct-axis flux $\psi_d$ 158 and quadrature-axis flux $\psi_q$ 160. To obtain flux 156, vectors representing permanent magnet flux $\psi_{m0}$ 162, quadrature-axis flux $\psi_q$ 160, and flux $L_d \cdot I_d$ 164 may be summed.

To obtain an optimum torque control algorithm for above base speed operation, a torque equation should be considered. A general equation representing motor torque $T_{mot}$ in the synchronous reference frame may be written as follows:

$$T_{mot} = \frac{3}{2} \cdot p_n \cdot I_q \cdot [\psi_{m0} - (L_q - L_d) \cdot I_d]. \tag{17}$$

By rewriting equations (10) and (11) with the assumption that the voltage drop across stator resistance R is negligible above base speed, the following equations may be obtained:

$$V_d = -\omega_e \cdot L_q \cdot I_q \tag{18};$$

$$V_q = \omega_e \cdot L_d \cdot I_d + \omega_e \cdot \psi_{m0} \tag{19}.$$

When motor 10 operates above base speed, motor voltage remains constant according to the following equation:

$$V_{d.rtd}^2 + V_{q.rtd}^2 = V_{rtd}^2 \tag{20}.$$

To achieve above base speed operation, direct-axis current $I_d$ may cause permanent magnets 14 of motor 10 to become temporarily weakened or demagnetized. A direct-axis current $I_d$ that fully demagnetizes the permanent magnets 14 may be referred to as the "characteristic current." The characteristic current $I_{df}$ may be represented by the following equation:

$$I_{df} = -\frac{\psi_{m0}}{L_d}. \tag{21}$$

The torque equation may be normalized to the characteristic current $I_{df}$. Accordingly, a normalized torque is defined according to the following equations:

$$\hat{T} = \frac{T_{mot}}{T_{base}} = \frac{T_{mot}}{\frac{3}{2} \cdot p_n \cdot \psi_{m0} \cdot I_{df}}. \tag{22}$$

In the above equation (22), normalized base torque $T_{base}$ is defined according to the following equation:

$$T_{base} = \frac{3}{2} \cdot p_n \cdot \psi_{m0} \cdot I_{df}. \tag{23}$$

Substituting equation (17) into equation (22) produces the following equation:

$$\hat{T} = \frac{I_q}{I_{df}} \cdot \left[1 - \frac{L_d \cdot \left(\frac{L_q}{L_d} - 1\right) \cdot I_d}{\Psi_{m0}}\right] = \qquad (24)$$

$$\frac{I_q}{I_{df}} \cdot \left[1 - \frac{\left(\frac{L_q}{L_d} - 1\right) \cdot I_d}{\frac{\Psi_{m0}}{L_d}}\right] = \frac{I_q}{I_{df}} \cdot \left[1 - \left(\frac{L_q}{L_d} - 1\right) \cdot \frac{I_d}{I_{df}}\right].$$

Thus, the following normalized torque equation may be rewritten as the following equation:

$$\hat{T} = \hat{I}_q \cdot (1 - K \cdot \hat{I}_d) \qquad (25).$$

Equations (18) and (19) may also be rewritten in a normalized, per-unit form, according to the following equations:

$$\frac{V_d}{\omega_{e0} \cdot \Psi_{m0}} = \hat{V}_d \qquad (26)$$

$$= \frac{-\omega_e \cdot L_q \cdot I_q \cdot L_d}{\omega_{e0} \cdot \Psi_{m0} \cdot L_d}$$

$$= -\hat{\omega}_e \cdot (K+1) \cdot \hat{I}_q \text{ or } \frac{\hat{V}_d}{\hat{\omega}_e}$$

$$= -(K+1) \cdot \hat{I}_q.$$

$$\frac{V_q}{\omega_{e0} \cdot \Psi_{m0}} = \hat{V}_q \qquad (27)$$

$$= \frac{\omega_e \cdot L_d \cdot I_d}{\omega_{e0} \cdot \Psi_{m0}} + \frac{\omega_e \cdot \Psi_{m0}}{\omega_{e0} \cdot \Psi_{m0}}$$

$$= \hat{\omega}_e \cdot (\hat{I}_d + 1) \text{ or } \frac{\hat{V}_q}{\hat{\omega}_e}$$

$$= (\hat{I}_d + 1).$$

The motor voltage in a normalized form may thus be written as follows:

$$\frac{\hat{V}_{d.rtd}^2 + \hat{V}_{q.rtd}^2}{\hat{\omega}_e^2} = \frac{\hat{V}_{rtd}^2}{\hat{\omega}_e^2} \qquad (28)$$

$$= \hat{V}_{max}^2$$

$$= \hat{I}_q^2 \cdot (K+1)^2 + (\hat{I}_d + 1)^2.$$

In equation (28) above, normalized quadrature-axis current $\hat{I}_q$, normalized direct-axis current $\hat{I}_d$, normalized stator frequency $\hat{\omega}_e$, normalized maximum available voltage $\hat{V}_{max}$, and motor inductance ratio K may be described according to the following equations:

$$\left.\begin{array}{l}\hat{I}_q = \frac{I_q}{I_{df}}; \\ \hat{I}_d = \frac{I_d}{I_{df}}; \\ \hat{\omega}_e = \frac{\omega_e}{\omega_{e0}}; \\ \hat{V}_{max} = \frac{\hat{V}_{rtd}}{\hat{\omega}_e} = \frac{V_{rtd} \cdot \omega_{e0}}{\omega_{e0} \cdot \Psi_{m0} \cdot \omega_e} = \frac{V_{rtd}}{\Psi_{m0} \cdot \omega_e}; \\ K = \left(\frac{L_q}{L_d} - 1\right)\end{array}\right\} \qquad (29)$$

From the equations above, two normalized equations sharing two unknown variables normalized direct-axis current $\hat{I}_d$ and normalized quadrature-axis current $\hat{I}_q$, an above base speed operation may be determined. Normalized torque $\hat{T}$ and normalized maximum available voltage $\hat{V}_{max}$ may be obtained by way of the following equations:

$$\hat{T} = \hat{I}_q \cdot (1 - K \cdot \hat{I}_d) \qquad (30);$$

$$\hat{V}_{max}^2 = \hat{I}_q^2 \cdot (K+1)^2 + (\hat{I}_d + 1)^2 \qquad (31).$$

From equations (30) and (31), normalized torque $\hat{T}$ may be reduced to a function of normalized direct-axis current $\hat{I}_d$, normalized maximum available voltage $\hat{V}_{max}$, and motor inductance ratio K, in accordance with the following equation:

$$\hat{T}^2 \cdot (K+1)^2 = (1 - k \cdot \hat{I}_d)^2 \cdot [\hat{V}_{max}^2 - (1 + \hat{I}_d)^2] \qquad (32).$$

Equation (32) may be rewritten according to the following equation:

$$\hat{T} = \frac{1 - K \cdot \hat{I}_d}{K+1} \cdot \sqrt{\hat{V}_{max}^2 - (1 + \hat{I}_d)^2}. \qquad (33)$$

From equations (32) or (33), a theoretical maximum torque value may be determined as a function of normalized direct-axis current $\hat{I}_d$. A local maximum of normalized torque $\hat{T}$ may be obtained with a derivative according to the following equation:

$$\frac{d\hat{T}}{d\hat{I}_d} = -\frac{K}{K+1} \cdot \sqrt{\hat{V}_{max}^2 - (1+\hat{I}_d)^2} - \qquad (34)$$

$$\frac{(1 - K \cdot \hat{I}_d) \cdot (1 + \hat{I}_d)}{(K+1) \cdot \sqrt{\hat{V}_{max}^2 - (1+\hat{I}_d)^2}} = 0.$$

Equation (34) may alternatively be rewritten as the following equation:

$$-K \cdot [\hat{V}_{max}^2 - (1 + \hat{I}_{d\_max})^2] - (1 - K \cdot \hat{I}_{d\_max}) \cdot (1 + \hat{I}_{d\_max}) = 0 \qquad (35).$$

By manipulating equation (35), the following equation may be derived:

$$\hat{I}_{d\_max}^2 + \frac{3 \cdot K - 1}{2 \cdot K} \cdot \hat{I}_{d\_max} - \frac{1}{2} \cdot \left(\frac{1}{K} + V_{max}^2 - 1\right) = 0. \qquad (36)$$

It will be apparent that equation (36) is a quadratic equation in normalized direct-axis current $\hat{I}_d$. When motor inductance ratio K is greater than zero, meaning that the permanent magnets 14 of motor 10 are located beneath the surface of the rotor 22, the solution of the equation is equal to the following equation:

$$\hat{I}_{d\_max(K>0)} = \frac{1 - 3 \cdot K - \sqrt{K^2 \cdot \left(8 \cdot \hat{V}_{max}^2 + 1\right) + 2 \cdot K + 1}}{4 \cdot K}. \qquad (37)$$

When motor inductance ratio K is equal to zero, meaning that the permanent magnets 14 of motor 10 are located on the surface of the rotor 22, the following equations may be obtained:

$$\hat{T} = \sqrt{\hat{V}_{max}^2 - (1 + \hat{I}_d)^2}; \qquad (38)$$

$$\frac{d\hat{T}}{d\hat{I}_{d(K=0)}} = -\frac{(1 + \hat{I}_d)}{\sqrt{\hat{V}_{max}^2 - (1 + \hat{I}_d)^2}} = 0. \qquad (39)$$

As a result, when motor inductance ratio K is equal to zero, the normalized maximum direct-axis current $\hat{I}_{d\_max(K=0)}$ is equal to negative 1, as illustrated in the following equation:

$$\hat{I}_{d\_max(K=0)} = -1 \qquad (40).$$

A normalized maximum torque may be found by substituting the maximum direct access current $\hat{I}_{dmax}$ into equation (34). As a result, the normalized maximum torque $\hat{T}_{max(K>0)}$ when motor inductance ratio K is greater than zero will be equal to the following equation:

$$\hat{T}_{max(K>0)} = \frac{(1 - K \cdot \hat{I}_{d\_max})}{K+1} \cdot \sqrt{\hat{V}_{max}^2 - (1 + \hat{I}_{d\_max})^2} \qquad (41)$$

Accordingly, the normalized maximum torque $\hat{T}_{max(K=0)}$ when motor inductance ratio K is equal to zero may be described according to the equation (40) and (41) below:

$$\hat{T}_{max(K=0)} = \hat{V}_{max} \qquad (42).$$

Figure 4:
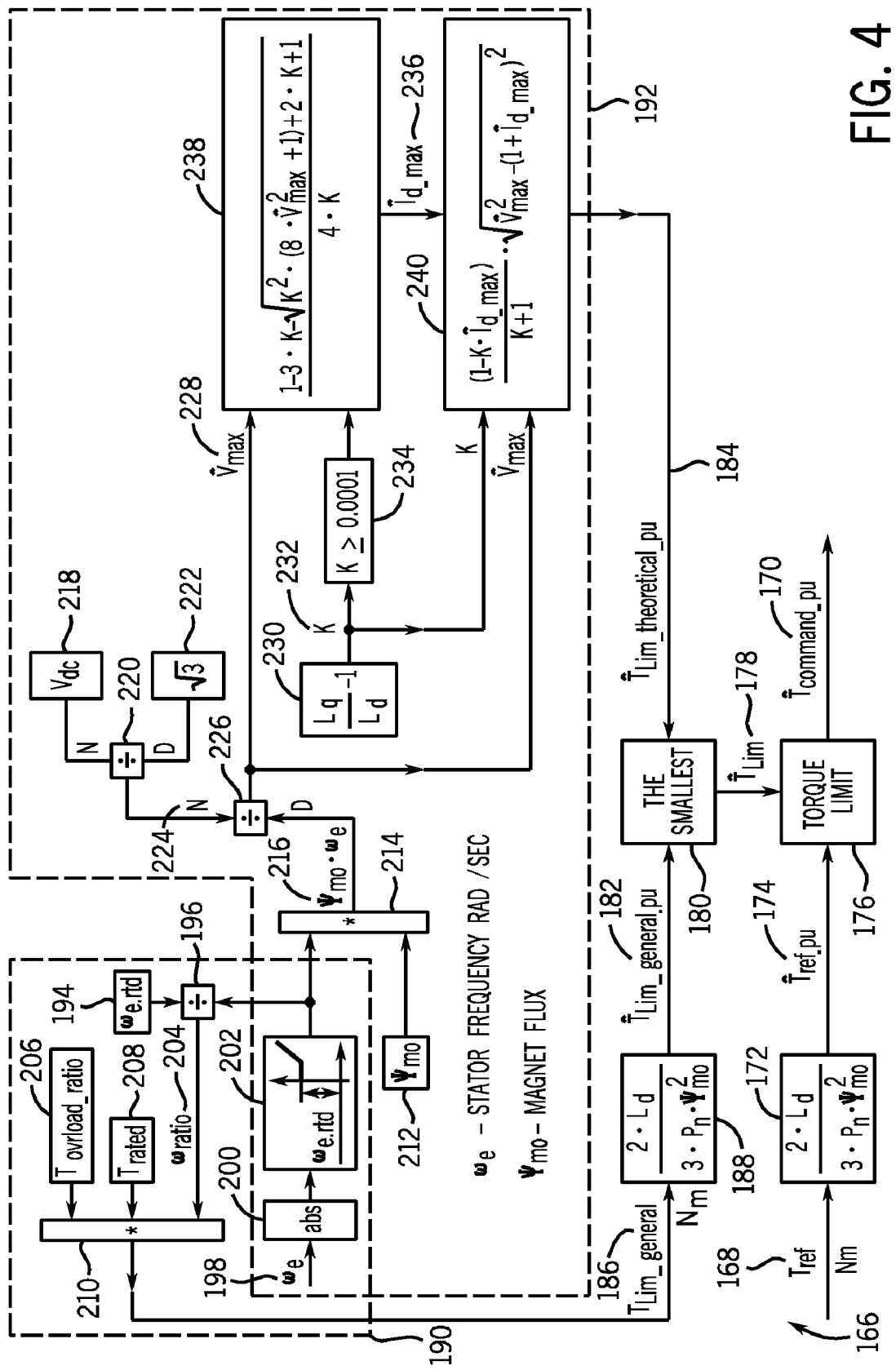
FIG. 4 is a block diagram of a torque limit control of the interior permanent magnet synchronous motor of FIG. 1 for above base speed operation in accordance with an aspect of the invention.

Turning to FIG. 4, a torque limit control block diagram 166 for above base speed operation of motor 10 illustrates a manner of appropriately limiting a reference torque command $T_{ref}$ 168 to produce a normalized torque command $\hat{T}_{command\_pu}$ 170. The normalized torque command $\hat{T}_{command\_pu}$ 170 is limited to prevent motor control circuitry and driver circuitry from attempting to exact a torque from motor 10 that would be impossible or that could result in a loss of control of motor 10.

To obtain the normalized torque command $\hat{T}_{command\_pu}$ 170, the reference torque command $T_{ref}$ 168 may first be normalized by multiplying the reference torque command $T_{ref}$ 168 by the contents of block 172, producing a normalized reference torque $\hat{T}_{ref\_pu}$ 174. The normalized reference torque $\hat{T}_{ref\_pu}$ 174 subsequently enters a torque limiter 176. If the normalized referenced torque $\hat{T}_{ref\_pu}$ 174 exceeds a normalized torque limit $\hat{T}_{Lim}$ 178, to be described in greater detail below, the normalized torque command $\hat{T}_{command\_pu}$ 170 is limited to, or made to equate, the normalized torque limit $\hat{T}_{Lim}$ 178.

The normalized torque limit $\hat{T}_{Lim}$ 178 represents a choice of the smallest 180 of either a normalized general torque limit $\hat{T}_{Lim\_general\_pu}$ 182 or a normalized theoretical torque limit $\hat{T}_{Lim\_theoretical\_pu}$ 184. To obtain a normalized general torque limit $T_{Lim\_general\_pu}$ 182, a general torque limit $T_{Lim\_general}$ 186 is normalized through multiplication by the contents of block 188.

The torque limit control block diagram 166 may be broken down into sub-diagrams 190 and 192. Sub-diagram 190 represents a portion of the torque limit control block diagram 166 that outputs the general torque limit $T_{Lim\_general}$ 186, which represents a physical torque limit above which the motor 10 may not physically produce additional torque.

To obtain the general torque limit $T_{Lim\_general}$ 186, a rated stator frequency $\omega_{e.rtd}$ 194 is first divided in division block 196 over a value representing an amount of stator frequency $\omega_e$ 198 which, in absolute value 200 terms, exceeds rated stator frequency $\omega_{e.rtd}$ by way of processing in block 202. A frequency ratio $\omega_{ratio}$ 204 results, which may be understood to represent a ratio of the rated stator frequency $\omega_{e.rtd}$ 194 to the amount of stator frequency $\omega_e$ 198 above base speed. The general torque limit $T_{Lim\_general}$ 186 is produced by multiplying a torque overload ratio $T_{ovrload\_ratio}$ 206, a rated torque $T_{rated}$ 208, and the frequency ratio $\omega_{ratio}$ 204 in multiplier 210.

Continuing to view FIG. 4, sub-diagram 192 represents the portion of torque limit control block diagram 166 that outputs the normalized theoretical torque limit $\hat{T}_{Lim\_theoretical\_pu}$ 184, represents a theoretical torque limit above which control circuitry may lose some control of the motor 10. To obtain the normalized theoretical torque limit $\hat{T}_{Lim\_theoretical\_pu}$ 184, permanent magnet flux $\Psi_{m0}$ 212 first enters a multiplier 214 to be multiplied against a value representing the amount of stator frequency $\omega_e$ 198 which, in absolute value 200 terms, exceeds the rated stator frequency $\omega_{e.rtd}$ by way of processing in block 202. A voltage $\Psi_{m0} \cdot \omega_e$ 216 results, which may also be represented as voltage $E_0$.

Dividing a voltage $V_{dc}$ 218 in division block 220 over $\sqrt{3}$ 222 produces a numerator N 224 with a value equal to a rated voltage $V_{rtd}$. Numerator N 224 is subsequently divided over voltage $\Psi_{m0} \cdot \omega_e$ 216 in division block 226, which in turn produces a normalized maximum available voltage $\hat{V}_{max}$ 228.

If the value of block 230, which represents motor inductance ratio K 232, is approximately greater than zero, as illustrated in block 234, then a normalized maximum direct-axis current $\hat{I}_{d\_max}$ 236 should be calculated via equation block 238. Regardless as to the value of motor inductance ratio K 232, normalized theoretical torque limit $\hat{T}_{Lim\_theoretical\_pu}$ 184 is obtained by way of equation block 240, which accepts as inputs the normalized maximum direct-axis current $\hat{I}_{d\_max}$ 236, motor inductance ratio K 232, and normalized maximum available voltage $\hat{V}_{max}$ 228.

As discussed above, the smallest 180 value of either the normalized general torque limit $\hat{T}_{Lim\_general\_pu}$ 182 or the normalized theoretical torque limit $\hat{T}_{Lim\_theoretical\_pu}$ 184 subsequently represents the normalized torque limit $\hat{T}_{Lim}$ 178. After the reference torque command $T_{ref}$ 168 is normalized in block 172, resulting in the normalized reference torque $\hat{T}_{ref\_pu}$ 174, the normalized reference torque $\hat{T}_{ref\_pu}$ 174 is limited to a maximum of the normalized torque limit $\hat{T}_{Lim}$ 178 through torque limiter 176. The limited torque is ultimately output as the normalized torque command $\hat{T}_{command\_pu}$ 170.

A universal adaptive torque control algorithm which may provide maximum torque per amperes control to a permanent magnet motor with any value of inductance ratio K may also be obtained. To obtain a universal torque control algorithm, normalized direct-axis current $\hat{I}_d$ may be obtained as a function of normalized torque $\hat{T}$, normalized maximum available voltage $\hat{V}_{max}$, and motor inductance ratio K. From equations (30) and (31), the following fourth order equation may be determined:

$$\hat{T}^2 \cdot (K+1)^2 = \hat{V}_{max}^2 \cdot (1 - K \cdot \hat{I}_d)^2 - (1 - K \cdot \hat{I}_d)^2 \cdot (1 + \hat{I}_d)^2 \qquad (43).$$

Figure 5:
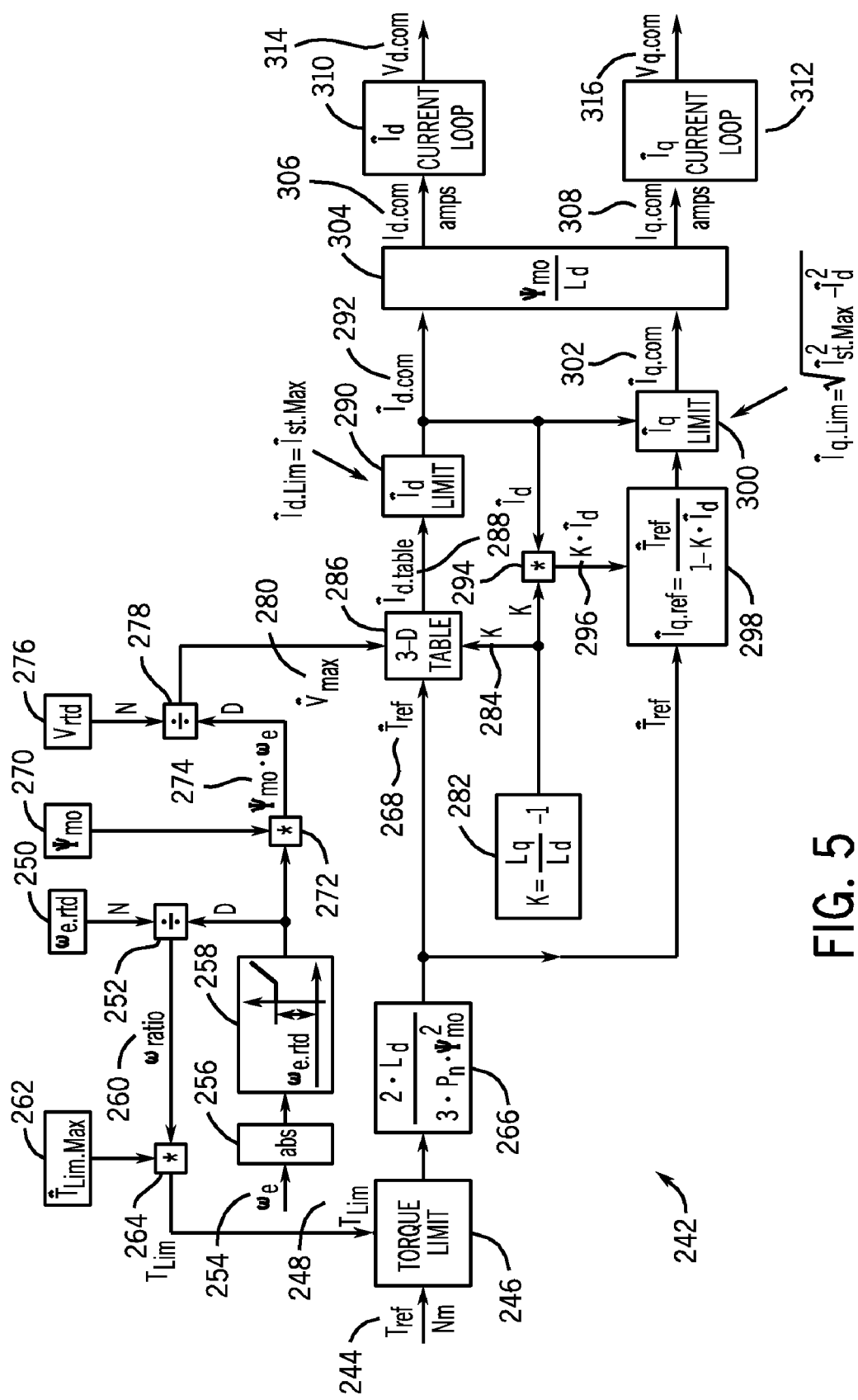
FIG. 5 is a block diagram of an optimum torque control of the interior permanent magnet synchronous motor of FIG. 1 for above base speed operation employing a three-dimensional table in accordance with an aspect of the invention.
Figure 7:
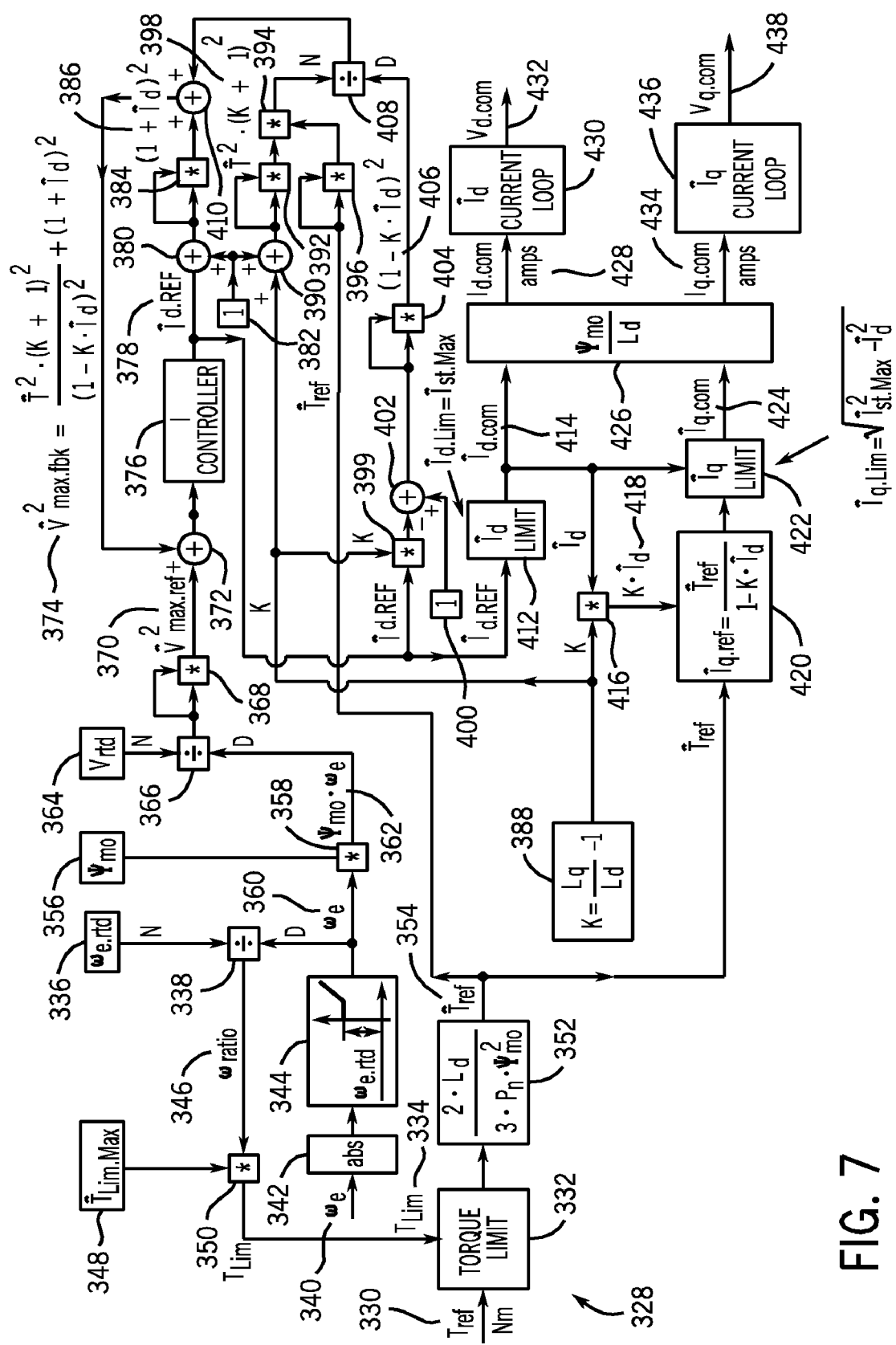
FIG. 7 is a block diagram of an optimum torque control of the interior permanent magnet synchronous motor of FIG. 1 for above base speed operation employing a closed-loop solver in accordance with an aspect of the invention.

Equation (43) may not be easily solved analytically. Thus, a practical implementation may involve solving the above equations numerically or with a closed loop solver. FIGS. 5-7 illustrate algorithms which may provide optimum torque control according to equation (43).

FIG. 5 illustrates an optimum torque control block diagram 242 employing a three-dimensional table to obtain a numerical solution of equation (43). In the three-dimensional table, values for normalized torque $\hat{T}$, normalized maximum available voltage $\hat{V}_{max}$, and motor inductance ratio K serve as inputs, and normalized direct-axis current $\hat{I}_d$ is output. Since the three-dimensional table employs calculations based on per-unit, or normalized, variables, the table may be said to be universal. Being universal, once the three-dimensional table is derived, the table may apply to any permanent magnet motor, as the table accounts for characteristic current $I_{df}$ and motor inductance ratio K.

The optimum torque control block diagram 242 begins when a reference torque command T$_{ref}$ 244 enters a torque limiter 246, which limits the reference torque command T$_{ref}$ 244 to a torque limit T$_{Lim}$ 248. It should be noted, however, the torque limiter 246 may also limit the reference torque command T$_{ref}$ 244 using the method illustrated by the torque limit control block diagram 166 of FIG. 4.

To obtain torque limit T$_{Lim}$ 248, a rated stator frequency $\omega_{e.rtd}$ 250 is divided in division block 252 over a value representing an amount of stator frequency $\omega_e$ 254 which, in terms of absolute value 256, exceeds rated stator frequency $\omega_{e.rtd}$ by way of processing in block 258. A frequency ratio $\omega_{ratio}$ 260 results, which may be understood to represent a ratio of the rated stator frequency $\omega_{e.rtd}$ 250 to the amount of stator frequency $\omega_e$ 254 above base speed. The torque limit T$_{Lim}$ 248 is obtained by multiplying a maximum torque limit T$_{Lim.Max}$ 262 in multiplier 264 by frequency ratio $\omega_{ratio}$ 260.

By multiplying the output of torque limiter 246 with the contents of block 266, a normalized reference torque $\hat{T}_{ref}$ 268 is obtained. In another location on the optimum adaptive torque control block diagram 242, permanent magnet flux $\Psi_{m0}$ 270 is multiplied in multiplier 272 with a value representing an amount of stator frequency $\omega_e$ 254 which, in terms of absolute value 256, exceeds rated stator frequency $\omega_{e.rtd}$ by way of processing in block 258. As a result, multiplier 272 outputs a voltage $\Psi_{m0} \cdot \omega_e$ 274. Rated voltage V$_{rtd}$ 276 may be divided by voltage $\Psi_{m0} \cdot \omega_e$ 274 in division block 278 to produce the normalized maximum available voltage $\hat{V}_{max}$ 280. In another location on the optimum torque control block diagram 242, block 282 represents an equation that outputs motor inductance ratio K 284.

Normalized reference torque $\hat{T}_{ref}$ 268, normalized maximum available voltage $\hat{V}_{max}$ 280, and motor inductance ratio K 284 enter a three-dimensional table 286, which represents a universal numerical solution to equation (43). For the given normalized reference torque $\hat{T}_{ref}$ 268, normalized maximum available voltage $\hat{V}_{max}$ 280, and motor inductance ratio K 284, the three-dimensional table 286 may provide an optimum normalized direct-axis current $\hat{I}_{d.table}$ 288.

The optimum normalized direct-axis current $\hat{I}_{d.table}$ 288 may be subsequently limited by a current limiter 290, which may limit the optimum normalized direct-axis current $\hat{I}_{d.table}$ 288 to a maximum normalized stator current $\hat{I}_{st.Max}$. The resulting current is represented by normalized direct-axis command current $\hat{I}_{d.com}$ 292. Multiplying motor inductance ratio K 284 with the normalized command current $\hat{I}_{d.com}$ 292 in multiplier 294 produces an interim current value $K \cdot \hat{I}_d$ 296. Interim current value $K \cdot \hat{I}_d$ 296 and normalized reference torque $\hat{T}_{ref}$ 268 are employed by equation block 298 to determine a normalized quadrature-axis current $\hat{I}_q$.

The normalized quadrature-axis current $\hat{I}_q$ output by equation block 298 and the normalized direct-axis command current $\hat{I}_{d.com}$ 292 may enter a current limiter 300, which subsequently may limit the normalized quadrature-axis current $\hat{I}_q$ to a value $\sqrt{\hat{I}_{st.Max}^2 - \hat{I}_{d.com}^2}$, which produces a normalized quadrature-axis command current $\hat{I}_{q.com}$ 302. By multiplying the normalized direct-axis command current $\hat{I}_{d.com}$ 292 and normalized quadrature-axis command current 302 by the contents of block $$304, \frac{\Psi_{m0}}{L_d},$$

otherwise known as the characteristic current I$_{dp}$ a direct-axis command current in amperes I$_{d.com}$ 306 and a quadrature-axis command current in amperes I$_{q.com}$ 308 may be obtained. The direct-axis command current I$_{d.com}$ 306 and the quadrature-axis command current I$_{q.com}$ 308 may subsequently be input in blocks 310 and 312, respectively, which represent the direct-axis and quadrature-axis current loops, to obtain direct-axis command voltage V$_{d.com}$ 314 and quadrature-axis command voltage V$_{d.com}$ 316.

FIG. 6 depicts an exemplary two-dimensional component 318 of the three-dimensional table 286. The two-dimensional component 318 represents a table of numerical solutions for flux current 320, otherwise known as the normalized direct-axis current $\hat{I}_d$ or the flux-producing current, at a single value D 322. Value D 322 is equal to the normalized maximum available voltage $\hat{V}_{max}$.

For varying values of torque per-unit 324, otherwise known as the normalized reference torque $\hat{T}_{ref}$, and values of motor inductance ratio K 326 ranging from zero to any appropriate value at any appropriate intervals, various numerical solutions to equation (43) for flux current 320 are displayed. It should be appreciated that any appropriate level of detail may be calculated and that the exemplary two-dimensional component of the three-dimensional table does not display all the values that may be desired for the three-dimensional table 286.

Rather than implement a numerical solution, as described in FIGS. 5 and 6, a closed loop solver solution may be derived based on equation (43). The closed-loop solver equation may be described as follows:

$$\hat{V}_{max}^2 = \frac{\hat{T}^2 \cdot (K+1)^2}{(1 - K \cdot \hat{I}_d)^2} + (1 + \hat{I}_d)^2. \quad (44)$$

FIG. 7 depicts an optimum torque control block diagram 328 based on the closed loop solver equation (44) above. In a manner similar to that of the optimum torque control block diagram 242 of FIG. 5, the optimum torque control block diagram 328 begins as a reference torque command T$_{ref}$ 330 enters a torque limiter 332, which limits the reference torque command T$_{ref}$ 330 to a torque limit T$_{Lim}$ 334. It should be noted, however, the torque limiter 332 may also limit the reference torque command T$_{ref}$ 330 using the method illustrated by the torque limit control block diagram 166 of FIG. 4.

To obtain torque limit T$_{Lim}$ 334, a rated stator frequency $\omega_{e.rtd}$ 336 is divided in division block 338 over a value representing an amount of stator frequency $\omega_e$ 340 which, in terms of absolute value 342, exceeds rated stator frequency $\omega_{e.rtd}$ by way of processing in block 344. A frequency ratio $\omega_{ratio}$ 346 results, which may be understood to represent a ratio of the rated stator frequency $\omega_{e.rtd}$ 336 to the amount of stator frequency $\omega_e$ 340 above base speed. The torque limit T$_{Lim}$ 334 is obtained by multiplying a maximum torque limit T$_{Lim.Max}$ 348 in multiplier 350 by frequency ratio $\omega_{ratio}$ 346.

By multiplying the output of torque limiter 332 with the contents of block 352, a normalized reference torque $\hat{T}_{ref}$ 354 may be obtained. The normalized reference torque $\hat{T}_{ref}$ 354 will be employed elsewhere in the optimum torque control block diagram 328.

In another location on the optimum torque control block diagram 328, permanent magnet flux $\Psi_{m0}$ 356 is multiplied in multiplier 358 with a value representing stator frequency $\omega_e$ 360 which, in terms of absolute value 342, exceeds rated stator frequency $\omega_{e.rtd}$ by way of processing in block 344. As a result, multiplier 358 outputs a voltage $\Psi_{m0} \cdot \omega_e$ 362. Rated voltage $V_{rtd}$ 364 may be divided by voltage $\Psi_{m0} \cdot \omega_e$ 362 in division block 366, producing normalized maximum available voltage $\hat{V}_{max}$.

When the output of division block 366, equal to normalized maximum available voltage $\hat{V}_{max}$, is multiplied in multiplier 368 against itself, the output is $\hat{V}_{max.ref}^2$ 370. The value of $\hat{V}_{max.ref}^2$ 370 enters a summer 372, from which feedback $\hat{V}_{max.fbk}^2$ 374 is subtracted. The result enters a current controller 376, which outputs an optimum normalized direct-axis reference current $\hat{I}_{d.ref}$ 378. The optimum normalized direct-axis reference current $\hat{I}_{d.ref}$ 378 enters a summer 380 to which the contents of block 382, a value of 1, are added. The output of summer 380 is multiplied against itself in multiplier 384, producing $(1+\hat{I}_d)^2$ 386.

At another location on the optimum torque control block diagram 328, motor inductance ratio K 388 enters a summer 390 with the contents of block 382, a value of 1. The output of summer 390 is multiplied against itself in multiplier 392, the result of which is subsequently multiplied in multiplier 394 with the a square of the normalized reference torque $\hat{T}_{ref}$ 354, which results when the normalized reference torque $\hat{T}_{ref}$ 354 is multiplied against itself in multiplier 396. The output of the multiplier 394 is $\hat{T}^2 \cdot (k+1)^2$ 398.

Motor inductance ratio K 388 also enters multiplier 399 with the optimum normalized direct-axis reference current $\hat{I}_{d.ref}$ 378, the output of which is subtracted from the contents of block 400, a value of 1, in summer 402. The output of summer 402 is subsequently multiplied against itself in multiplier 404 to produce $(1-K \cdot \hat{I}_d)^2$ 406. The value $\hat{T}^2 \cdot (k+1)^2$ 398 is divided by $(1-K \cdot \hat{I}_d)^2$ 406 in division block 408, the result of which subsequently enters summer 410 with $(1+\hat{I}_d)^2$ 386. Summer 410 ultimately outputs feedback $\hat{V}_{max.fbk}^2$ 374.

The optimum normalized direct-axis reference current $\hat{I}_{d.ref}$ 378 also enters a current limiter 412, which may limit the optimum normalized direct-axis reference current $\hat{I}_{d.ref}$ 378 to a maximum normalized stator current $\hat{I}_{st.Max}$. The resulting current is represented by a normalized direct-axis command current $\hat{I}_{d.com}$ 414. Multiplying motor inductance ratio K 388 with the normalized command current $\hat{I}_{d.com}$ 414 in multiplier 416 produces an interim current value $K \cdot \hat{I}_d$ 418. Interim current value $K \cdot \hat{I}_d$ 418 and normalized reference torque $\hat{T}_{ref}$ 354 are subsequently employed by equation block 420 to determine a normalized quadrature-axis current $\hat{I}_{q.ref}$.

The normalized quadrature-axis current $\hat{I}_{q.ref}$ output by equation block 420 and the normalized direct-axis command current $\hat{I}_{d.com}$ 414 may enter a current limiter 422, which subsequently may limit the normalized quadrature-axis current $\hat{I}_{q.ref}$ to a value $\sqrt{\hat{I}_{st.Max}^2 - \hat{I}_{d.com}^2}$, which produces a normalized quadrature-axis command current $\hat{I}_{q.com}$ 424.

By multiplying the normalized direct-axis command current $\hat{I}_{d.com}$ 414 by the contents of block 426, $$\frac{\Psi_{m0}}{L_d},$$

otherwise known as the characteristic current $I_{df}$ a direct-axis command current in amperes $I_{d.com}$ may be obtained. The direct-axis command current in amperes $I_{d.com}$ 428 may subsequently be input in block 430, which represents the direct-axis current loop, to obtain an optimum direct-axis command voltage $V_{d.com}$ 432. Similarly, by multiplying the normalized quadrature-axis command current $\hat{I}_{q.com}$ 424 by the contents of block 426, $$\frac{\Psi_{m0}}{L_d},$$

otherwise known as the characteristic current $I_{df}$ a quadrature-axis command current in amperes $I_{q.com}$ 434 may be obtained. The quadrature-axis command current $I_{q.com}$ 434 may subsequently be input in block 436, which represents the quadrature-axis current loop, to obtain an optimum quadrature-axis command voltage $V_{q.com}$ 438.

It should be noted that the torque limit algorithm described in FIG. 4 may be employed by the universal adaptive torque control approaches of FIGS. 5-7. Additionally or alternatively, the torque limit algorithm may be employed with any appropriate algorithm for controlling a motor for either above base speed or below base speed. Such algorithms for controlling a motor may include, for example, a voltage loop algorithm, a minimum flux algorithm, or an algorithm for maintaining control of a motor operating below base speed after a decrease in line voltage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a permanent magnet motor comprising:
    determining, via a processor, a physical torque limit based on a frequency or speed;
    determining, via a processor, a theoretical torque limit based on a value of available voltage and an inductance ratio value of the motor;
    determining, via a processor, a normalized theoretical torque limit by normalizing the theoretical torque limit and multiplying the normalized theoretical torque limit by a value of flux-producing current capable of fully canceling a field of permanent magnets in the motor; and
    outputting to motor control circuitry a command corresponding to the smaller of the physical torque limit and the normalized theoretical torque limit.

2. The method of claim 1, wherein the physical torque limit is determined by computing a ratio of a rated stator frequency to stator frequency, and multiplying the ratio by a rated torque and an overload torque ratio.

3. The method of claim 1, wherein a received torque command is normalized to obtain a normalized torque command, and wherein determining the physical torque limit comprises determining a normalized physical torque limit, and wherein limiting the torque command comprises limiting the normalized torque command to the smaller of the normalized physical torque limit and the normalized theoretical torque limit, and setting the torque command to a denormalized value based upon the normalized torque command or utilizing the normalized torque command as the torque command.

4. The method of claim 3, wherein the normalized torque command, the normalized physical torque limit, and the normalized theoretical torque limit are normalized to a characteristic current of the motor.

5. The method of claim 1, wherein the value of available voltage is based on the frequency or speed, a rotor flux value, and a rated voltage of the motor.

6. The method of claim 5, wherein the value of available voltage is determined by dividing the rated voltage of the motor by a multiple of the frequency or speed and the rotor flux value.

7. A method of controlling a permanent magnet motor comprising:
receiving at motor control circuitry a torque command; and
limiting, via a processor, the torque command to a theoretical torque limit based at least in part on an inductance ratio value of the motor; the theoretical torque limit being determined by determining a normalized theoretical torque limit and multiplying the normalized theoretical torque limit by a value of flux-producing current capable of fully canceling a field of permanent magnets in the motor.

8. The method of claim 7, wherein the theoretical torque limit is determined based at least in part on the inductance ratio value of the motor, a rotor flux, and a frequency or speed.

9. The method of claim 7, wherein determining the normalized theoretical torque limit comprises determining a normalized available voltage.

10. The method of claim 9, wherein the normalized available voltage ($\hat{V}_{max}$) is determined according to the following relationship between the normalized available voltage ($\hat{V}_{max}$), a rated voltage ($V_{rtd}$), a rotor flux ($\Psi_{m0}$), and a frequency or speed ($\omega_e$):

$$\hat{V}_{max} = \frac{V_{rtd}}{\Psi_{m0} \cdot \omega_e}.$$

11. The method of claim 7, wherein determining the normalized theoretical torque limit comprises determining a normalized flux-producing current.

12. The method of claim 11, wherein determining the normalized flux-producing current ($\hat{I}_{d\_(K>0)}$) comprises setting the normalized flux producing current to a value of −1 when the inductance ratio value of the motor is equal to 0, and to a value obtained by the following relationship between the inductance ratio value (K) of the motor and a normalized available voltage ($\hat{V}_{max}$) when the inductance ratio value (K) of the motor is greater than 0:

$$\hat{I}_{d\_max(K>0)} = \frac{1 - 3 \cdot K - \sqrt{K^2 \cdot (8 \cdot \hat{V}_{max}^2 + 1) + 2 \cdot K + 1}}{4 \cdot K}.$$

13. The method of claim 7, wherein the normalized theoretical torque limit ($\hat{T}_{max(K>0)}$) is determined according to the following relationship between the normalized theoretical torque limit ($\hat{T}_{max(K>0)}$), a normalized flux-producing current ($\hat{I}_{d\_max(K>0)}$), the inductance ratio value of the motor (K), and the normalized available voltage ($\hat{V}_{max}$):

$$\hat{T}_{max(K>0)} = \frac{(1 - K \cdot \hat{I}_{d\_max})}{K+1} \cdot \sqrt{\hat{V}_{max}^2 - (1 + \hat{I}_{d\_max})^2}.$$

14. The method of claim 7, wherein the torque command is limited to the smaller of the theoretical torque limit and a physical torque limit based on a frequency or speed and an overload torque ratio.

15. The method of claim 7, wherein the torque command is normalized to a flux-producing current capable of fully demagnetizing permanent magnets of the motor to obtain a normalized torque command, and wherein the normalized torque command is limited to a normalized theoretical torque limit equal to the theoretical torque limit normalized to the flux-producing current capable of fully canceling a field of permanent magnets of the motor.

16. A motor controller comprising:
control circuitry configured to generate a control signal for driving a three-phase inverter, wherein the control circuitry is configured to determine and output a torque command to a theoretical torque limit based at least in part on an inductance ratio of the permanent magnet motor; wherein the theoretical torque limit is representative of a torque value above which the control circuitry will lose some control of the motor, the torque value being determined by determining a normalized theoretical torque limit and multiplying the normalized theoretical torque limit by a value of flux-producing current capable of fully canceling a field of permanent magnets in the motor.

17. The motor controller of claim 16, wherein the control circuitry is configured to limit the torque command to the theoretical torque limit based at least in part on the inductance ratio of the permanent magnet motor, a value of available voltage, and a flux-producing current.

18. The motor controller of claim 16, wherein the control circuitry is configured to limit the torque command to a lesser of the theoretical torque limit or a physical torque limit based on a frequency or speed.

19. A method of controlling a permanent magnet motor comprising:
applying a flux-producing current to the motor such that a flux produced by the flux-producing current temporarily weakens a field of permanent magnets in the motor;
applying a torque-producing current to the motor; and
limiting the flux-producing current and the torque-producing current based on a torque limit normalized to a characteristic current of the motor, wherein the characteristic current of the motor is a flux-producing current capable of temporarily weakening the field of the permanent magnets of the permanent magnet motor.

20. The method of claim 19, wherein the torque limit normalized to the characteristic current of the motor is based on a normalized theoretical torque limit based at least in part on an inductance ratio value of the motor.

21. The method of claim 20, wherein the normalized theoretical torque limit is determined based on the inductance ratio of the permanent magnet motor, a normalized available voltage, and a normalized flux-producing current.

* * * * *